United States Patent [19]

Fukui et al.

[11] Patent Number: 4,462,957
[45] Date of Patent: Jul. 31, 1984

[54] SLIDING MECHANISM

[75] Inventors: Yutaka Fukui; Yoshimitsu Tobita; Fumio Hataya; Mitsuhiro Watanabe; Noriaki Mase, all of Hitachi, Japan

[73] Assignee: Hitachi, Ltd., Tokyo, Japan

[21] Appl. No.: 281,333

[22] Filed: Jul. 8, 1981

[30] Foreign Application Priority Data

Jul. 9, 1980 [JP] Japan .................................. 55-92735

[51] Int. Cl.³ .............................................. G21C 7/10
[52] U.S. Cl. .................................... 376/327; 376/353; 376/900; 75/128 C; 420/446; 308/6 R
[58] Field of Search ......................... 308/6 R, DIG. 8; 376/327, 900, 353; 75/128 C; 420/442, 446; 148/427, 428

[56] References Cited

U.S. PATENT DOCUMENTS

| | | | |
|---|---|---|---|
| 2,136,946 | 11/1938 | McCurdy ..................... | 308/DIG. 8 |
| 3,912,503 | 10/1975 | Schumacher et al. ............ | 75/128 C |
| 3,929,520 | 12/1975 | Hellner et al. .................... | 75/128 C |
| 4,039,356 | 8/1977 | Schumacher et al. ............ | 75/128 C |
| 4,099,967 | 7/1978 | Schumacher et al. ............ | 75/128 C |
| 4,118,223 | 10/1978 | Acuncius et al. ................. | 420/446 |
| 4,220,689 | 9/1980 | Schumacher et al. ............ | 75/128 C |
| 4,246,048 | 1/1981 | Kawai et al. ........................ | 376/900 |

FOREIGN PATENT DOCUMENTS

| | | | |
|---|---|---|---|
| 46-9536 | 3/1971 | Japan ................................ | 75/128 C |
| 54-162093 | 12/1979 | Japan ................................. | 376/327 |
| 56-14990 | 2/1981 | Japan ................................. | 376/327 |
| 56-48587 | 5/1981 | Japan ................................. | 376/353 |
| 56-48588 | 5/1981 | Japan ................................. | 376/353 |
| 891318 | 3/1962 | United Kingdom ............... | 376/900 |

OTHER PUBLICATIONS

Nuclear Eng. Int., 11/73, p. 877.
Toshiba Review, vol. 34, No. 10 (1979), pp. 828-831, Arii et al.

*Primary Examiner*—Harvey E. Behrend
*Attorney, Agent, or Firm*—Antonelli, Terry & Wands

[57] ABSTRACT

A sliding mechanism comprising two members maintained in sliding contact with each other, wherein one of the members (which may be a pin) is formed of an alloy consisting essentially of, by weight, less than 0.3% carbon, 7-40% nickel, 15-28% chromium, 2-8% silicon, 3-12% manganese and the balance essentially iron, and the other member (which may be a roller) is formed of an alloy consisting essentially of, by weight, less than 0.5% carbon, 13-22% chromium, less than 2% silicon, less than 2% manganese, 3-10% molybdenum, 10% of at least one of titanium and aluminum and the balance essentially nickel, the two members having a difference in Vickers hardness of below 200 at their contact surfaces. The sliding mechanism has particualr utility as means for guiding a control rod of a nuclear reactor by means of pins and rollers.

5 Claims, 10 Drawing Figures

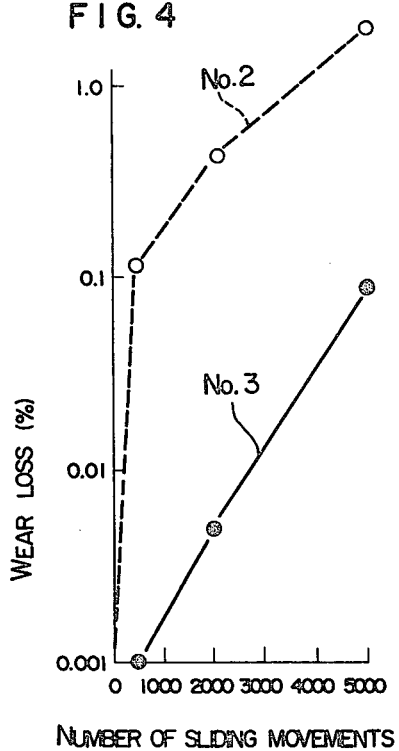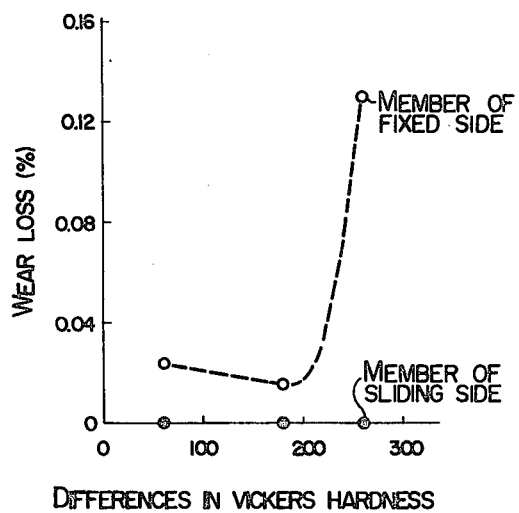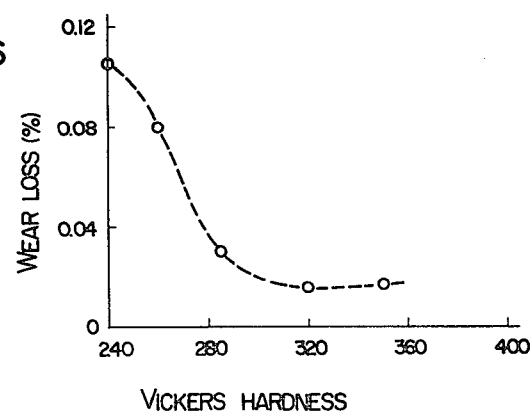

x 400 x 400

SLIDING MECHANISM

BACKGROUND OF THE INVENTION

1. Field of the Invention

This invention relates to novel sliding mechanisms, and more particularly to a sliding mechanism for nuclear reactors including pins and rollers for guiding a control rod for use in a reactor core.

2. Description of the Prior Art

A control rod for use in a core of a nuclear reactor has guide means including rollers, formed of a cobalt base superalloy, and pins formed of a forged cobalt base alloy. The cobalt base superalloy used for forming the rollers contains 1% carbon and 28% chromium. Because of this composition, the superalloy contains large amounts of carbides and has high hardness, and it is highly resistant to corrosion with respect to pure water at high temperature and high pressure due to the high chromium content. These properties make the superalloy suitable as material for forming the rollers of a control rod. On the other hand, the forged cobalt base alloy used for forming the pins has a relatively low carbon content of 0.1% and a low chromium content of 20% because the alloy is required to be forgeable, workable and weldable. Nevertheless, the alloy has high wear and corrosion resistance.

Due to the fact that such alloys contain about 65% of cobalt in roller material and about 50% of cobalt in pin material, abrasion powder of cobalt is produced by the wear of the two members while in service, and cobalt is released from the alloy due to corrosion by pure water at high temperature and high pressure. This raises the problem that the cobalt ion and crud in the coolant becomes radioactive and circulates through the system.

In Toshiba Review, Vol. 34, No. 10 (1979) the use a nitronic #60 alloy is proposed. This alloy consists essentially of, by weight, 0.07% carbon, 8.48% manganese, 4.03% silicon, 16.94% chromium, 8.58% nickel, 0.25% molybdenum and the balance iron and having a Rockwell C scale hardness HRC 22 and a Vickers hardness Hv 253 for forming the pins and CFA consisting essentially of, by weight, 0.57% manganese, 0.27% silicon, 37.5% chromium, 3.72% aluminum, 1.12% molybdenum and the balance nickel and having a Rockwell C scale hardness $H_{RC}$ 55 and a Vickers hardness Hv 595 for forming the rollers, to obviate the problem of the radioactive cobalt. It has been found that this combination poses the problem that since the roller and the pin have differences in hardness of 33 in $H_{RC}$ and 342 in Hv, wear would be caused particularly on the pin which is lower in hardness.

SUMMARY OF THE INVENTION

1. Object of the Invention

This invention has as its object the provision of a sliding mechanism for a nuclear reactor which is highly resistant to wear and free from the risk of producing induced radioactivity through cobalt, and, more particularly a, sliding mechanism including pins and rollers serving as guide means for a control rod for use in a core of a nuclear reactor.

2. Statement of the Invention

The sliding mechanism according to the invention comprises two members maintained in sliding contact with each other, characterized in that one of the members is formed of an alloy consisting essentially of, by weight, less than 0.3% carbon, 7-40% nickel, 15-28% chromium, 2-8% silicon, 3-12% manganese and the balance essentially iron and the other member is formed of an alloy consisting essentially of, by weight, less than 0.5% carbon, 13-22% chromium, 3-10% molybdenum, less than 10% of at least one of titanium and aluminum and the balance essentially nickel, the two members having a difference of less than 200 in Vickers hardness at surfaces thereof in contact with each other.

To avoid production of abrasion powder requires the provision of the alloy with a predetermined hardness. The hardness of an alloy can be attained by (a) precipitation hardening due to the presence of precipitates and (b) solid solution hardening of the matrix. Precipitation hardening in (a) can be effectively achieved with carbides and intermetallic compounds. In obtaining solid solution hardening of the matrix in (b), it has effect to make the alloy contain in large amounts of molybdenum, tungsten and other solid solution strengthening elements as well as manganese and silicon. Also, work hardening as by cold working has effect in hardening alloys. With regard to corrosion of alloys by water of high temperature and high pressure, the amounts of chromium, nickel, nitrogen and carbon play an important role in avoiding the phenomenon. Nitrogen had better not be added because this element is believed to have the possibilities of promoting radiation embrittlement due to radioactivity. However, since this element is inevitably incorporated during production, it is advisable to minimize its content.

In view of the foregoing, we have conducted sliding wear tests in pure water by selecting the following four types of alloy: (1) γ′ phase precipitation type superalloys of the nickel base having high titanium and aluminum contents and containing a large amount of chromium; (2) alloys of the nickel base having high molybdenum and silicon contents in which an intermetallic compounds have been crystallized or precipitated, (3) iron base alloys having high manganese and silicon contents and having been hardened especially by cold working and (4) alloys of the nickel-chromium-iron base having high molybdenum and tungsten contents and further having been subjected to cold working. The results of the tests show that the alloys of (1) and (3) are suitable for forming rollers and pins respectively and that the wear resistance characteristics can be optimized by combining the alloys different in their base compositions.

However, it is impossible to improve the wear resistance characteristics of the two types of alloys merely by combining them. We have found that the difference in their Vickers hardnesses is an important factor in improving their wear resistances, or more specifically, the difference in their hardnesses should be below 200 in Hv to optimize the wear resistance characteristics.

The reasons for placing limitations on the composition of the iron base alloys according to the invention are as follows. When the carbon content exceeds 0.3%, carbon combines with chromium to produce a carbide and reduces the corrosion resistance of the matrix and lowers the workability of the alloys, causing crack formation when the alloy is subjected to cold or hot working. On the other hand when the carbon content is too low, the hardness is reduced, so that the optimum range in carbon content is between 0.05 and 0.15%. When the nickel content exceeds 40%, the corrosion resistance is improved, but it is uneconomical and undesirable to use this element in excess of 40%. When the nickel content is less than 7%, the austenitic structure is unstable. The preferred range in nickel content is between 7 and 12%. When the chromium content is less than 15% the corrosion resistance is reduced, whereas when it exceeds 28% the possibility of chromium in combining with carbon is increased thereby making the alloy brittle. The preferred range in chromium content is between 16 and 22%. When the silicon content is less than 2%, desired hardness and corrosion resistance are unobtainable, and when it exceeds 8% the alloy becomes brittle to reduce the workability. The preferred range in silicon content is between 2 and 6%. When the manganese content is less than 3%, enough work hardenability is unobtainable, and when it exceeds 12%, the corrosion resistance is reduced. The preferred range in manganese content is between 4 and 10%.

The alloys according to the invention are preferably added with nitrogen for improving the wear resistance characteristics. The higher the nitrogen content, the better. However, when the nitrogen content is too high, such a possibility is considered that nitrogen combines with chromium to produce a carbide thereby reducing the corrosion resistance of the matrix and simultaneously the radiation embrittlement is promoted. Therefore, the nitrogen content is preferably less than 800 ppm, and most preferably less than 600 ppm.

The alloys according to the invention are preferably subjected to cold plastic working to increase hardness. The hardness is increased with difficulty when the cold working ratio exceeds 40% in the reduction of area, and no satisfactory hardening is obtainable when the cold working ratio is less than 5% in the reduction of area. The most preferred range in cold working ratio is between 20 and 40%. The alloys are preferably subjected to solution heat treatment prior to cold working.

The iron base alloys according to the invention have a Vickers hardness of over Hv 300, which is desirable from the point of view of increasing strength and wear resistance of the alloys.

The iron base alloys according to the invention preferably has a microstructure which is predominantly an austenite phase, and it is particularly preferable that the austenite phase matrix contains a very small amount of carbide finely precipitated therein.

The reasons for placing limitations on the composition of the nickel base alloys according to the invention are as follows. When the carbon content exceeds 0.5%, carbon combines with chromium to produce a carbide and reduces the corrosion resistance of the matrix. The most preferred range in carbon content is between 0.05 and 0.2%. When the chromium content is less than 13%, the corrosion resistance is reduced, whereas when it exceeds 22% the possibility of chromium in combining with carbon is increased thereby making the alloy brittle. Particularly the range in chromium content between 15 and 20% is most suitable. When the molybdenum content is less than 3%, solid solution hardenability and corrosion resistance of the matrix is reduced, whereas when it exceeds 10%, the alloys become too hard to perform machining with ease. The preferred range in molybdenum content is between 4 and 8%. When the titanium or aluminum content or the titanium plus aluminum content exceeds 10%, the alloys become too hard, so that cracking is liable to occur during casting and machinability is reduced. Addition of titanium and/or aluminum is important in the invention because the hardness of the alloys is increased by the precipitation of $Ni_3(Al, Ti)$ compounds in place of the carbides. The preferred ranges in contents are between 0.3 and 3% for titanium and between 3 and 8% for aluminum, and between 3.3 and 8.3% for titanium plus aluminum. The preferred silicon and manganese contents are less than 2%, respectively.

The nickel base alloys according to the invention are preferably subjected to aging treatment following solution heat treatment, to produce eutectic carbides in the grain boundaries by solidification and $Ni_3(Al, Ti)$ intermetallic compounds precipitated by aging. Particularly, they preferably have a Vickers hardness Hv of over 450. Solution heat treatment and aging treatment are preferably performed with temperature ranges of between 1000° and 1500° C. and between 750° and 850° C., respectively.

The alloys according to the invention are preferably in the form of castings subjected to solution heat treatment and aging treatment.

When used for producing a sliding mechanism comprising members in sliding engagement with each other in pure water of high temperature and high pressure in the core of a nuclear reactor, the combination of an iron base alloy and a nickel base alloy according to the invention produces sliding mechanism members of excellent wear resistance characteristics. Particularly in guide mechanism for a control rod of a nuclear reactor comprising fixed rollers and pins each rotating about the axis of one of the fixed rollers in pure water of high temperature and high pressure, the pins are preferably formed of alloys consisting essentially of, by weight, 0.05–0.15% carbon, 7–12% nickel, 16–22% chromium, 2–6% silicon, 4–10% manganese, less than 0.08% nitrogen and the balance essentially iron and subjected to cold plastic working with a reduction of area of 5–40%, and the rollers are preferably formed of castings of alloys consisting essentially of, by weight, 0.05–0.2% carbon, 0.1–1% silicon, 0.1–1% manganese, 15–20% chromium, 4–8% molybdenum, 0.3–3% titanium, 3–8% aluminum, with the total of titanium and aluminum being 3.3–8.3%, and the balance essentially nickel and subjected to aging. The rollers preferably have a Vickers hardness higher, at their contact surfaces, by 0–200 than that of the pins at their contact surfaces.

BRIEF DESCRIPTION OF THE DRAWINGS

FIGS. 2–4 are graphs showing the relation between the number of sliding movements and the wear loss;

FIG. 5 is a graph showing the relation between the difference in Vickers hardness between the fixed member and the sliding member and the wear loss;

FIG. 6 is a graph showing the relation between the Vickers hardness of the fixed member and the wear loss;

EXAMPLES

Table 1 shows the chemical composition of the alloys used in the sliding wear tests.

TABLE 1

| | Unit Specimen (No.) | Weight (%) | | | | | | | | | ppm |
|---|---|---|---|---|---|---|---|---|---|---|---|
| | | C | Si | Mn | Ni | Cr | Fe | W | Ti | Al | Mo | N |
| Member of Fixed Side | 1 | 0.1 | 4.0 | 7.5 | 8.5 | 17 | Bal. | — | — | — | — | 250 |
| | 2 | 0.1 | 0.8 | 0.7 | Bal. | 16.5 | 5.0 | 4.5 | — | — | 17 | — |
| Member of Sliding (Movable) Side | 3 | 0.1 | 1.0 | 1.0 | Bal. | 15.5 | — | — | 2.5 | 5.0 | 5.0 | — |
| | 4 | 0.1 | 3 | 1.0 | Bal. | 15 | — | — | — | — | 32 | — |
| | 5 | 0.1 | 0.5 | 0.5 | Bal. | 15.5 | — | — | 0.5 | 6.5 | 5.0 | — |

Table 2 shows the heat treatment to which the materials were subjected and the Vickers hardness (Hv) thereof.

TABLE 2

| Specimen (No.) | History of Heat Treatment and Working | Hardness (Hv) |
|---|---|---|
| 1 | 1100° C. × 1 h. AC, 35% Cold Working | 320 |
| 2 | 1100° C. × 1 h. AC, 35% Cold Working | 430 |
| 3 | 1018° C. × 4 h. AC, 800° C. × 1 h. AC, (Casting) | 500 |
| 4 | 1100° C. × 1 h. AC, (Casting) | 580 |
| 5 | 1018° C. × 4 h. AC, 800° C. × 1 h. AC, (Casting) | 380 |

Materials of specimens Nos. 1 and 2 were used for producing pins corresponding to the members of the fixed side, and materials of specimens Nos. 3–5 were used for producing rollers corresponding to the members of the sliding (movable) side. Sliding wear tests were conducted on these materials by using the testing machine shown in FIG. 1 in pure water under the following test conditions; temperature, room temperature; sliding cycle, 28 times/min.; sliding distance, 60 mm/time; and surface pressure, 25 Kg/cm$^2$. The wear loss was determined after 500, 2000 and 5000 times.

Figure 1:
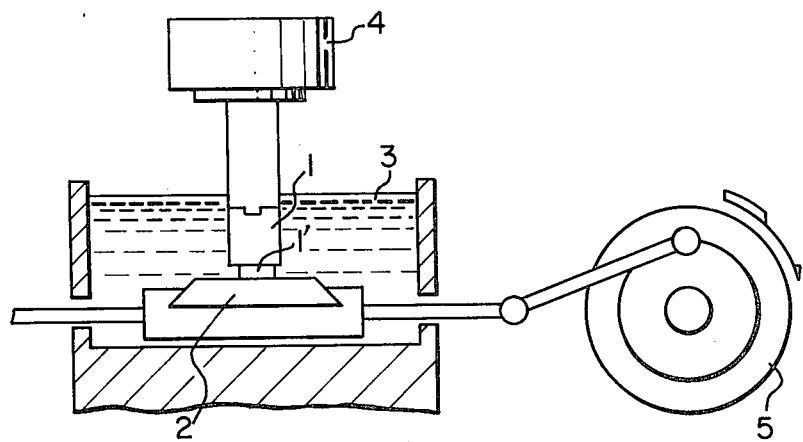
FIG. 1 is a schematic sectional view of the sliding wear testing machine used in the invention.

In FIG. 1, the numeral 1 designates a fixed member of a diameter of 10 mm at its forward end 1', which applies a load to a sliding member 2 of a trapezoidal shape by means of a loading device 4. The sliding member 2 is maintained in contact with the fixed member 1 in pure water 3 while being loaded. Rotation of a rotating wheel 5 moves the sliding member 2 in sliding reciprocatory movement in contact with the fixed member.

Figure 2:
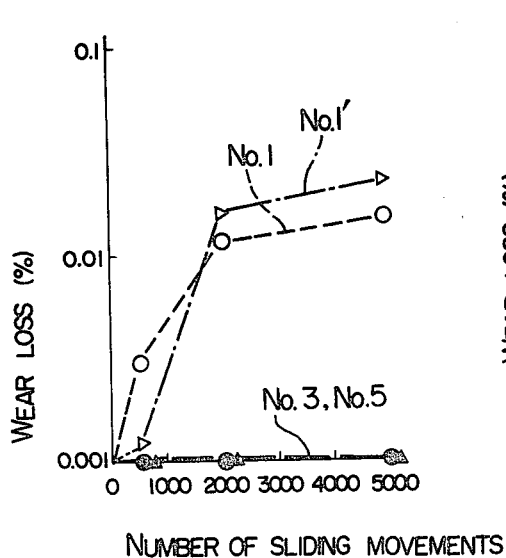
Figure 3:
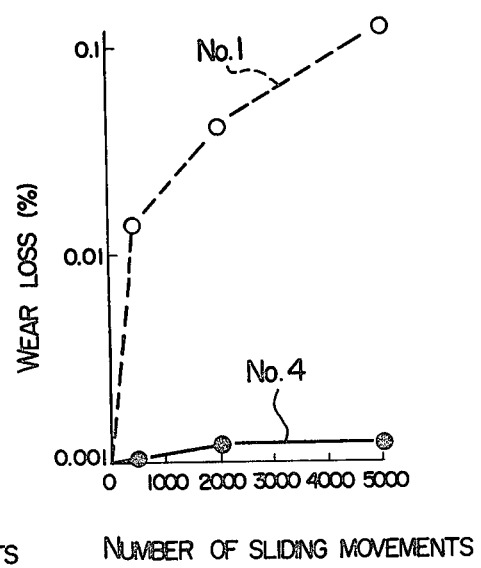

FIGS. 2–4 are graphs showing the results of the wear tests. The wear is represented by a wear loss expressed in percent per total weight of the specimen prior to the test. FIG. 2 shows the data obtained with the combination of specimen No. 1 with specimen No. 3 and specimen No. 1 (No. 1' in the figure) with No. 5. As shown in FIG. 2, the member of the fixed side (No. 1) underwent slight wear although the wear was very little and the member of the sliding side suffered almost no wear, indicating that the two specimens have excellent wear resistance characteristics.

FIG. 3 shows the results of tests in which specimen No. 1 was used for the member of the fixed side and specimen No. 4 was used for the member of the sliding side for forming a combination. It will be seen in the figure that the member of the fixed side shows increased wear as compared with the member of the fixed side shown in FIG. 2 and that the member of the sliding side also shows a slight increase in wear.

FIG. 4 shows the results of tests in which specimen No. 2 was used for the member of the fixed side and specimen No. 3 was used for the member of the sliding side for forming a combination. It will be seen that both the member of the fixed side and the member of the sliding side show marked wear. From the foregoing, it will be understood that the materials show different wear resistance characteristics depending on their combination. For example, specimen No. 1 showing excellent results as a member of the fixed side and the specimen showing excellent results as a member of the sliding side in FIG. 2 would undergo wear in one or both of them, when they form a combination with incompatible materials.

FIG. 5 shows the difference in Vickers hardness Hv between the member of the fixed side and the member of the sliding side (the member of the fixed side is generally lower in hardness than the member of the sliding side) in relation to wear loss (%). It will be seen that almost no wear is observed in the member of the fixed side when the difference in Vickers hardness Hv is below 200.

FIG. 6 shows changes in hardness caused by varying the degree of cold working (reduction of area) performed on the member of the sliding side (specimen No. 3) and the member of the fixed side (specimen No. 1) in relation to the wear loss. It will be seen that the member of the fixed side shows excellent wear resistance characteristics when its Vickers hardness Hv is over 300.

Meanwhile observations on the worn surfaces and other surfaces after the tests show that all the alloys have metallic luster and present no evidence of corrosion. It has been ascertained that the iron base alloys and the nickel base alloys show excellent corrosion resistance characteristics when their chromium contents are over 15% and 13%, respectively.

Figure 7:
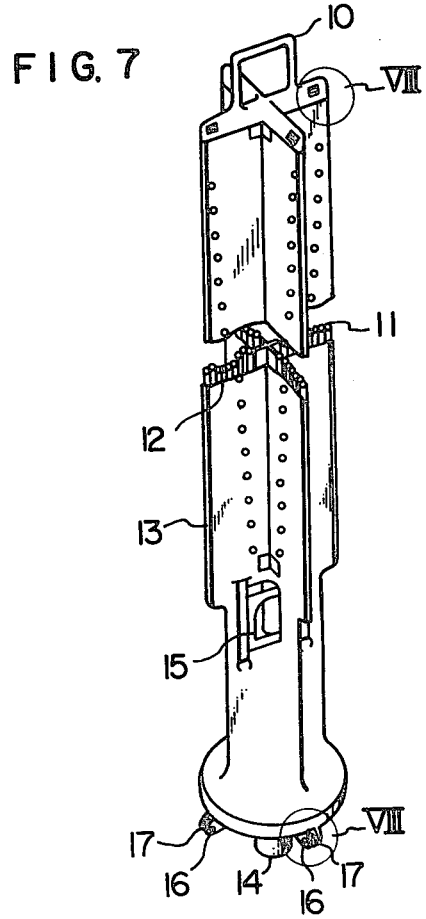
FIG. 7 is a perspective view of a control rod of a nuclear reactor.
Figure 8:
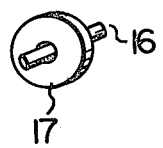
FIG. 8 is a perspective view of the pin and roller constituting guide mechanism for the control rod shown in section VIII in FIG. 7.

FIG. 7 is a schematic perspective view of a control rod for the core of a nuclear reactor including pins 16 formed of alloy No. 1 and rollers 17 formed of alloy No. 3 according to the invention. FIG. 8 is a perspective view of a combination of the pin 16 with the roller 17 shown in section VIII in FIG. 7. As shown, a plurality of sets of pins 16 and rollers 17 are provided so that four sets are attached to the upper and lower ends of the control rods. The pin 16 of each combination is affixed to the control rod and supports the associated pin for rotation. A handle 10 is attached to the upper end of the control rod including neutron absorbing rods 11 housed in a sheath 12 for blades 13. The numerals 14 and 15 indicate a socket and a release handle, respectively.

From the foregoing, it will be appreciated that the guide mechanism for a control rod for use in the core of a nuclear reactor formed of the alloys according to the invention have excellent wear resistance characteristics and a prolonged service life.

Figure 9A:
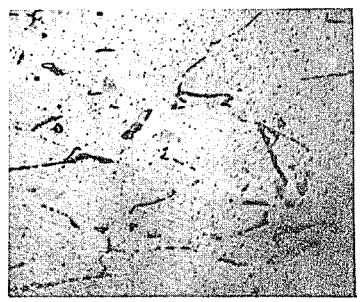
FIGS. 9a and 9b are microscopic photographs showing the microstructures of the alloys used for forming the pins and rollers.
Figure 9B:
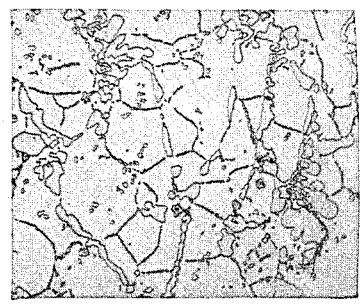

FIGS. 9a and 9b are microscopic photographs (×400) of the alloys No. 1 and No. 3 according to the invention used for forming the pins and rollers, showing their respective microstructures. As shown in FIG. 9a, the alloy No. 1 according to the invention has a microstructure in which a very small amount of carbides are finely precipitated in the matrix of an austenite phase. The alloy No. 3 according to the invention has, as shown in FIG. 9b, a microstructure having a matrix of an austenite phase in which a very small amount of eutectic carbides are formed by crystallization in the grain boundaries and a γ' phase [Ni₃(Al, Ti) intermetallic compounds] is finely precipitated in the grains.

The alloys according to the invention have been shown and described hereinabove as being used for forming pins and rollers for guiding a control rod of a nuclear reactor. It is to be understood, however, that the invention is not limited to this specific application, and that the alloys according to the invention may be used for all the sliding mechanisms in the circulating systems in a nuclear reactor, which are required to have corrosion resistance and wear resistance in combination.

When the alloys according to the invention are used in combination for forming rollers and pins of a control rod of a nuclear reactor exposed to pure water of high temperature and high pressure, there is no risk of producing induced radioactivity in cobalt because the alloys contain no cobalt. The rollers and pins formed of the alloys according to the invention are high in reliability in construction because they have excellent corrosion resistance and wear resistance characteristics.

What is claimed is:

1. A sliding mechanism comprising a fixed pin and a roller rotating about the axis of said pin, characterized in that the pin is formed of an alloy having predominantly an austenite microstructure and consisting essentially of, by weight, less than 0.3% carbon, 7-40% nickel, 15-28% chromium, 2-8% silicon, 3-12% manganese and the balance essentially iron and the roller is formed of an alloy having a microstructure in which a γ' phase is precipitated in an austenite phase matrix and consisting essentially of, by weight, less than 0.5% carbon, 13-22% chromium, less than 2% silicon, less than 2% manganese, 3-10% molybdenum, 3-8% of aluminum, less than 10% of titanium and the balance essentially nickel, the pin and the roller having a difference of less than 200 in Vickers hardness at surfaces thereof in sliding contact with each other, said pin having been subjected to cold plastic working to provide the surface contacting the surface of the roller with a Vickers hardness of more than 300 and the roller having been subjected to solution heat treatment to cause precipitation of a γ' phase to occur and then to an aging treatment to provide a γ' phase precipitated in fine grain size therein and to exhibit a higher hardness than said pin.

2. A sliding mechanism comprising a fixed pin and a roller rotating about the axis of said fixed pin, wherein said pin is formed of an alloy having predominantly an austenite phase and consisting essentially of, by weight, 0.05-0.15% carbon, 7-12% nickel, 16-22% chromium, 2-6% silicon, 4-10% manganese, less than 0.08% nitrogen and the balance essentially iron, said alloy having been subjected to cold plastic working with a reduction in area of 5-40%, and wherein said roller is formed of a casting of an alloy having a γ' phase precipitated in an austenite phase matrix and consisting essentially of, by weight, 0.05-0.2% carbon, 0.1-1% silicon, 0.1-1% manganese, 15-20% chromium, 4-8% molybdenum, 0.3-3% titanium, 3-8% aluminum, titanium and aluminum being 3.3-8.3% in total, and the balance essentially nickel, said roller having a Vickers hardness higher by 0-200 than that of said pin at their sliding contact surfaces, said pin having been subjected to cold plastic working to provide the surface contacting the surface of the roller with a Vickers hardness of more than 300 and the roller having been subjected to solution heat treatment to cause precipitation of a γ' phase to occur and to an aging treatment to provide a γ' phase precipitated in fine grain size therein and to exhibit a higher hardness than said pin.

3. A sliding mechanism comprising a fixed pin and a roller rotating about the axis of said pin in pure water at high temperature and high pressure in a nuclear reactor, wherein the pin is formed of an alloy having predominantly an austenite microstructure and consisting essentially of, by weight, less than 0.3 carbon, 7-40% nickel, 15-28% chromium, 2-8% silicon, 3-12% manganese and the balance essentially iron, and the roller is formed of an alloy having a microstructure in which γ' phase is precipitated in an austenite phase matrix and consisting essentially of, by weight, less than 0.5% carbon, 13-22% chromium, less than 2% silicon, less than 2% manganese, 3-10% molybdenum, 3-8% of aluminum, less than 10% of titanium and the balance essentially nickel, the difference between said pin and said roller in Vickers hardness being less than 200 at their sliding contact surfaces, said pin having been subjected to cold plastic working to provide the surface contacting the surface of the roller with a Vickers hardness of more than 300 and the roller having been subjected to solution heat treatment to cause precipitation of a γ' phase to occur and then to an aging treatment to provide a γ' phase precipitated in fine grain size therein and to exhibit a higher hardness than said pin.

4. A sliding mechanism as claimed in claim 3, wherein said roller has been subjected to aging treatment and has a Vickers hardness of over 450 at a surface thereof in contact with said pin.

5. Control rod guide mechanism for a nuclear reactor comprising a fixed pin and a roller adapted to rotate about the axis of said pin in pure water of high temperature and high pressure, wherein said pin is formed of an alloy having predominantly an austenite microstructure and consisting essentially of, by weight, 0.05-0.15 carbon, 7-12% nickel, 16-22% chromium, 2-6% silicon, 4-10% manganese, less than 0.08% nitrogen and the balance essentially iron, said alloy having been subjected to cold plastic working with a reduction in area of 5-40%, and wherein said roller is formed of a casting of an alloy having a γ' phase precipitated in an austenite phase matrix and consisting essentially of, by weight, 0.05-0.2% carbon, 0.1-1% silicon, 0.1-1% manganese, 15-20% chromium, 4-8% molybdenum, 0.3-3% titanium, 3-8% aluminum, titanium and aluminum being 3.3-8.3% in total, and the balance essentially nickel, said roller having a Vickers hardness higher by 0-200 than that of said pin at their sliding contact surfaces, said pin having been subjected to cold plastic working to provide the surface contacting the surface of the roller with a Vickers hardness of more than 300 and the roller having been subjected to solution heat treatment to cause precipitation of a γ' phase to occur and then to an aging treatment to provide a γ' phase precipitated in fine grain size therein and to exhibit a higher hardness than said pin.

* * * * *